US008427305B2

(12) United States Patent
Madsen et al.

(10) Patent No.: US 8,427,305 B2
(45) Date of Patent: Apr. 23, 2013

(54) GLOBAL POSITIONING SATELLITE [GPS] BASED RECOVERY DEVICE AND RISK MANAGEMENT SYSTEM FOR PORTABLE COMPUTING DEVICES AND DATA

(76) Inventors: John J. Madsen, Round Rock, TX (US); Michael J. Coker, Round Rock, TX (US)

( * ) Notice: Subject to any disclaimer, the term of this patent is extended or adjusted under 35 U.S.C. 154(b) by 598 days.

(21) Appl. No.: 12/461,482

(22) Filed: Aug. 12, 2009

(65) Prior Publication Data

US 2010/0188287 A1 Jul. 29, 2010

Related U.S. Application Data

(60) Provisional application No. 61/188,727, filed on Aug. 12, 2008.

(51) Int. Cl.
*G08B 1/08* (2006.01)
(52) U.S. Cl.
USPC .............. 340/539.13; 340/539.1; 340/539.11; 342/357.2; 705/4
(58) Field of Classification Search ............. 340/539.13, 340/539.1
See application file for complete search history.

(56) References Cited

U.S. PATENT DOCUMENTS

| 5,748,084 | A | * | 5/1998 | Isikoff | 340/568.1 |
| 6,266,533 | B1 | * | 7/2001 | Zadeh et al. | 455/456.2 |
| 6,448,928 | B1 | * | 9/2002 | Knox et al. | 342/357.31 |
| 7,030,810 | B1 | * | 4/2006 | Walters et al. | 342/357.31 |
| 7,714,712 | B2 | * | 5/2010 | Emigh et al. | 340/539.13 |
| 2003/0119529 | A1 | * | 6/2003 | Hirokawa | 455/456 |
| 2005/0046567 | A1 | * | 3/2005 | Mortenson et al. | 340/539.13 |
| 2006/0075506 | A1 | * | 4/2006 | Sanda et al. | 726/26 |
| 2006/0170588 | A1 | * | 8/2006 | Chang | 342/357.1 |
| 2009/0187433 | A1 | * | 7/2009 | Nudd | 705/4 |

* cited by examiner

*Primary Examiner* — Kerri McNally
(74) *Attorney, Agent, or Firm* — Lightbulb IP, LLC

(57) ABSTRACT

A device and software utilizing Global Positioning Satellite [GPS] technologies for monitoring and recovering portable computing devices and, a method and system for acquiring such devices and for compensating owners of devices. The invention inserts a GPS mechanism into a computing device that is enabled once the device is reported missing. The GPS emits real time tracking of missing devices that may be coordinated with security agencies to intercept and recover missing computing devices. When a stolen device is unrecoverable, the invention may receive a signal to initiate data recovery where a wireless network is available to recover data for the owner. Alternatively, the GPS mechanism instructs the device to destroy stored data files to prevent commercial espionage or privacy violations. The invention discloses a software system and method for computing a purchase price of the GPS mechanism, computing compensation for loss of the device and lost data.

7 Claims, 5 Drawing Sheets

Figure 1A. Frontal plane view of GPS tracking device to be installed in a portable computing device.
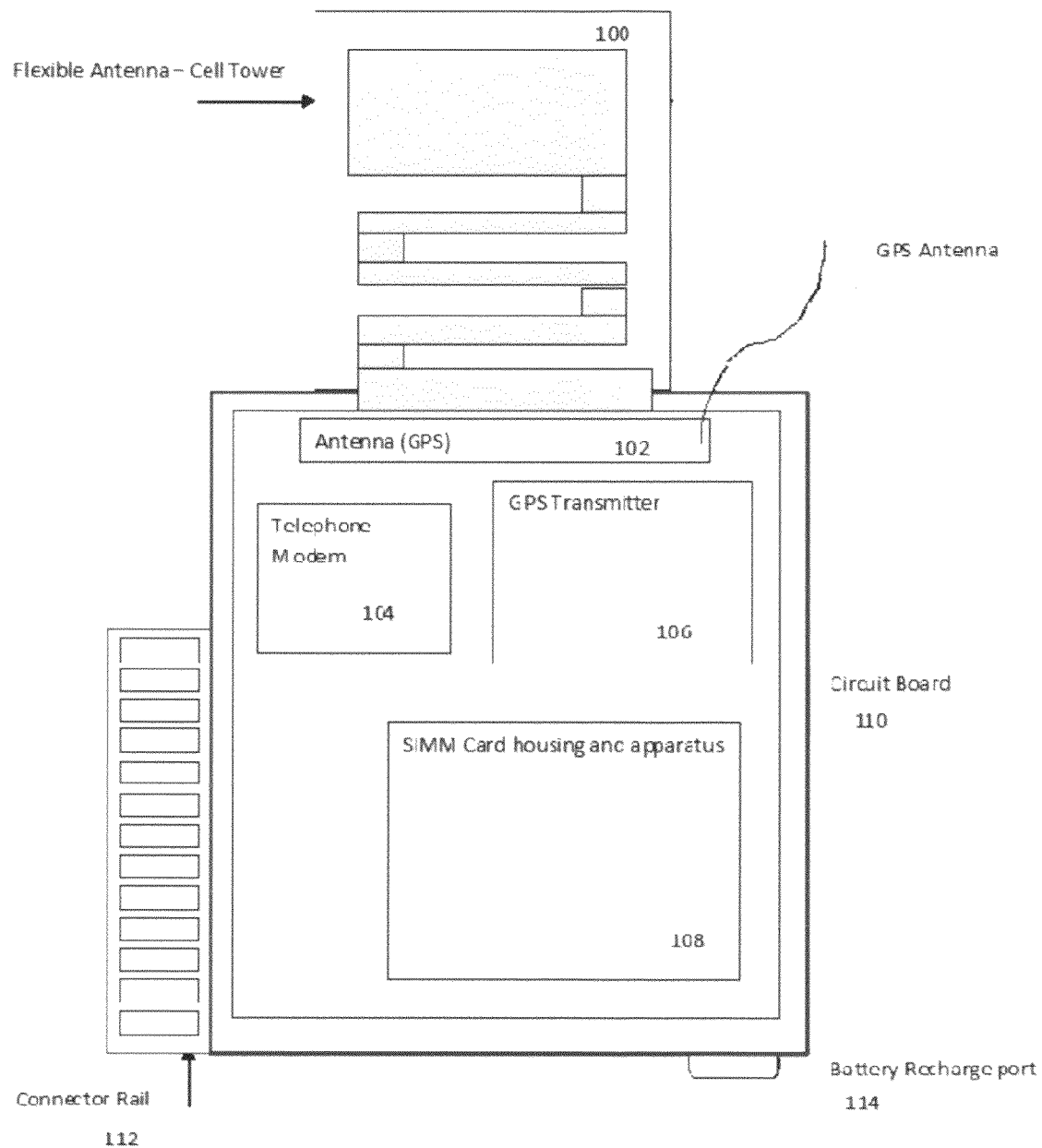

Figure 1B. Back plane view of GPS tracking device to be installed in a portable computing device.
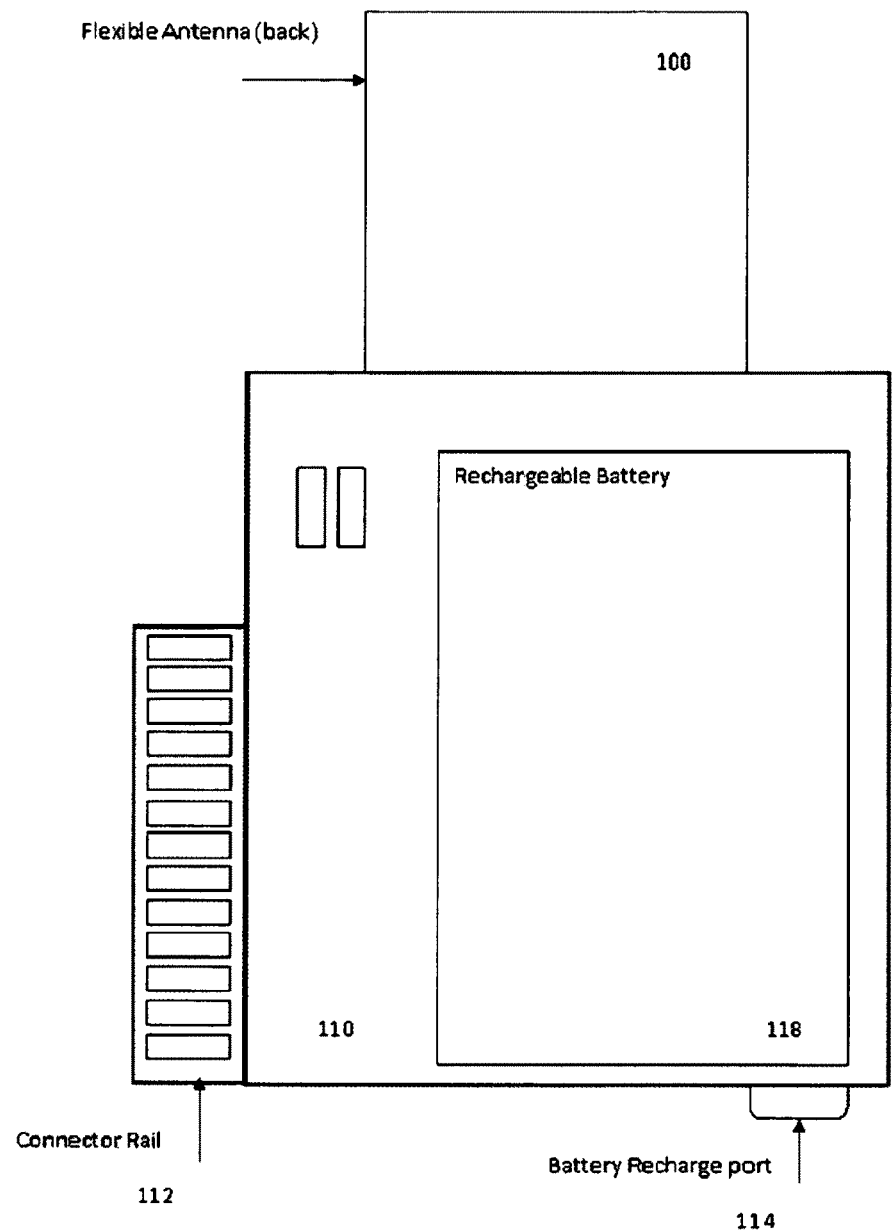

Figure 1C. Side plane view of GPS tracking device to be installed in a portable computing device.
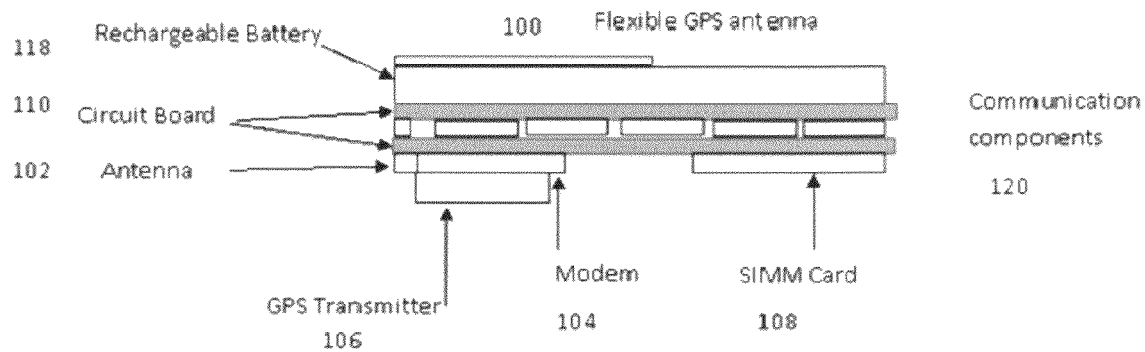

Figure 2. Process and software block flow diagram for use of the installed device of Figures 1A-C in the event of theft or loss of the portable computing device.
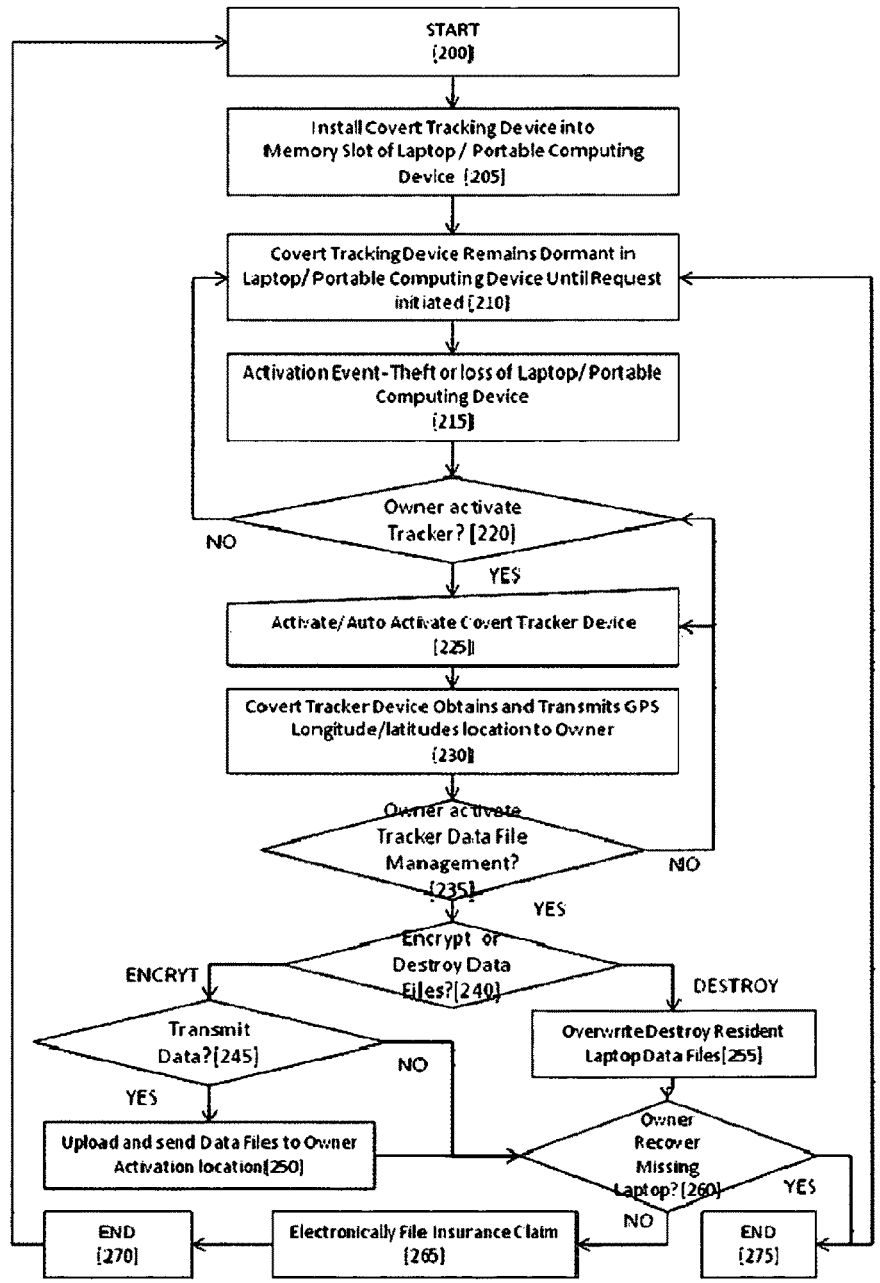

Figure 3. Block diagram illustrating a preferred method and system for purchase, registration, signal generation, tracking and control of the installed exemplary device of Figures 1A-C.
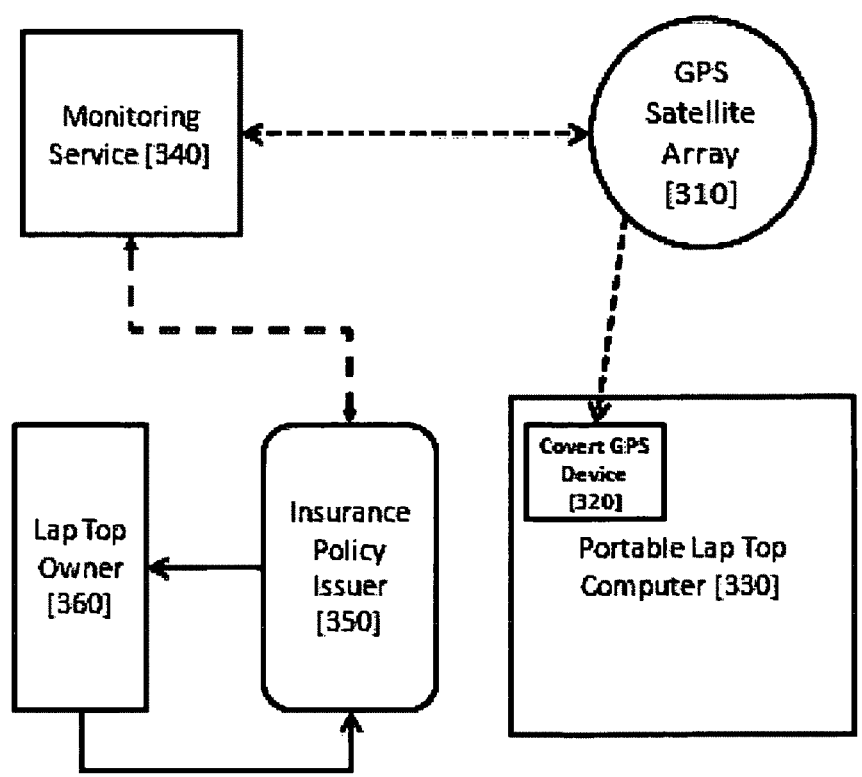

GLOBAL POSITIONING SATELLITE [GPS] BASED RECOVERY DEVICE AND RISK MANAGEMENT SYSTEM FOR PORTABLE COMPUTING DEVICES AND DATA

RELATED U.S. APPLICATION DATA

This invention derives from Provisional Patent Application Ser. No. 61/188,727 dated Aug. 12, 2008 filed with the U.S. Patent and Trademark Office.

BACKGROUND TO THE INVENTION

With the advent of telecommunications, it has become useful and desirable for enterprises and individuals to employ various forms of sensors and communications devices to monitor the condition and location of certain assets such as portable computing devices. Advances in digital, electronic and wireless communication devices have extended the range and convenience of portable asset monitoring. Global Positioning Satellites (GPS) such as Inmarstat, Iridium, Globalstar, or Msat now increase the accuracy of portable asset location and movement. Such technologies are significant in improving efficiency and economic management of portable assets. Such devices and business practices are well known in the prior art.

Due to the growth of the Information Technology (IT) infrastructure and general decrease in costs and sizes of GPS device components, there has been a growing demand for GPS implementation within portable assets. One such area has been portable computing devices. As individuals and enterprises expand the use of portable computing devices such as lap top computers, there has been an increasing recognition of the vulnerability such devices have for theft or loss and the corresponding increase in economic value and corresponding loss when theft or loss occurs. For example, of the more than 10,000 laptops that go missing every month at Chicago O'Hare Airport, approximately only 22% are ever recovered.

A problem in the prior art has been an inability to configure and fabricate GPS devices that were compact enough to conveniently install on portable computing devices. A further problem is the inability to configure an embedded antennae configuration with such a compact GPS device that will reliably transmit such signals usable by a GPS tracking network for device recovery in the event of theft or loss. A still further problem has been a lack of means to configure such GPS devices for simple, rapid and covert installation into existing portable computing devices that will be both efficacious yet difficult to detect and disable by thieves. A still further problem in the prior art is the lack of an enabling system to instruct the installed GPS device in a portable computing device to instruct the computing device to transmit, alter or destroy stored data files to prevent economic loss or breach of privacy rights. A still further problem is the lack of a suitable business method and process to price, acquire and install such GPS devices, concurrent with a method to price and provide a risk management financial instrument to compensate a purchaser for potential the risk of loss and impairments occasioned by the irrecoverable or partial recovery of portable computing devices and data therein installed.

Currently, GPS is a fast-growing field. Cell phones currently have the ability to have GPS on them as do automobiles, which has made GPS products an off-the-shelf product. However, in the present invention, the device's solutions and implementation, and the size of the unit make it unique. What also makes it unique is a novel, computationally based recovery replacement program that utilizes a generated insurance service to mitigate the risks and costs associated with theft and loss of portable computing devices.

Therefore, a first object of the present invention is to disclose a novel and useful GPS device and antennae system that may be covertly and efficiently installed into a portable computing device through the memory slots on the motherboard.

A second further object of the invention is to disclose a novel means to employ specific software ("Silver Bullet software") in the GPS device that may independently instruct the portable computing device to transmit, alter or destroy data files in the portable computing device to prevent loss of economic value or personal privacy through the unique coding of the Silver Bullet software application.

A third further object of the present invention is to disclose a novel computerized and enabled method to acquire and install such a GPS device and software and to provide a computer generated insurance product to compensate for accidental loss or theft of such portable computing devices.

DESCRIPTION OF PRIOR ART

There are approximately a dozen disclosures describing GPS features that relate to portable device theft and recovery that constitutes the known prior art relating to the present invention. The present invention provides novel and useful improvements, methods and processes for reducing economic and property losses related to the theft or loss of portable computing devices which, without limitation, is distinguished from the prior art in the following discussion.

In the US patent application published as US20060007039A1, a method and system are disclosed for expanding law enforcement recovery efforts for missing vehicles using VHF enabled networks and concealed GPS receivers. The present invention application is distinguished in that its hardware elements are novel and unique to the small dimensions of a portable computing device. A further limitation of the prior invention is that it substantially provides only passive tracking capabilities. An improvement of this invention over the prior art is the novel enablement of the tracking device to receive and initiate certain limited and useful operations of the stolen or missing computing assets to prevent unauthorized use of its digital content.

As part of the prior art, the US patent application published as US20040198309A1, discloses a stolen vehicle tracking and recovering method that utilizes cellular telecommunication networks for providing location guidance information to improve vehicle recovery. An improvement of this invention over the prior art is its use of an implanted GPS device within a portable computing device that communicates directly via a Global Positioning Satellite network and independently of the operating system of the portable computing device.

In the US patent application US20030005316A1, the prior art teaches a mobile system that is provided with a theft recovery mechanism comprising a host chipset and a locator subsystem connected to the host chipset that is arranged to determine a current location of the mobile system; and a main storage connected to the host chipset and arranged to store an operating system (OS) and contain an OS-Present application and/or a Pre-OS application configured to enforce security policies during user authentication and determine whether the mobile system may have been stolen or used inappropriately based on the security policies. A novel improvement of the present invention is its use of an implanted autonomous device that coordinates theft and tracking functions separate from an existing computing operating system. This improvement provides a measure of security from programming interference or compromise by software viruses that can attack and compromise mobile device operating systems.

In U.S. Pat. No. 5,793,283, 'Pager vehicle theft prevention and recovery system', the prior art teaches a theft prevention and recovery system using pager network for vehicles which transmits a designated electronic alarm signal via free space through electronic transceiver, when a remote alarm activation signal is received. The user instructs the transceiver to transmit a continuous pager signal containing longitudinal and latitudinal coordinates generated by the GPS. The longitudinal and latitudinal coordinates allow the car to be traced and recovered. The present invention is distinguished from this prior art because its mode of operation configures to the unique parameters of a personal computing system which contains data files. In the event of a loss or theft of the personal computing system it is a novel improvement of the present invention that it can determine and activate procedures on the data files if such data files must be cordoned off, destroyed, encrypted or transmitted to a remote and secure location.

Other prior art is disclosed In US20070180207A1, which involves secure RFID backup/restore for computing/pervasive devices. This prior art uses an automated Radio frequency identification (RFID) based data backup and recovery system for a computing device to invoke logic to initiate physical copying and transmission of digital storage device content to remote storage device. The present invention is distinguished by its separate universal GPS device that is installed in a portable computing device. Further the present invention requires positive activation by the user and can trigger disablement of the host computing device to prevent economic loss related to a potential disclosure breach of proprietary, personal or commercial data.

In US20060033616A1, 'Smart container gateway', the prior art comprises a smart container gateway that provides communication with global and local networks, container and cargo security sensors and cargo identification tags. The smart container gateway communicates with one or more networks by means of an integrated structural RF antenna, power generator and radio control subsystem. The present invention is distinguished in that its application requires insertion of a compact and covert device into the interior space of the portable computing device and requires external power from the host device and external activation prior to performing or activating to perform any function.

In the patent application, US20050017900A1, 'Tracking unit', the prior art describes a tracking unit for assisting in the recovery of stolen monies or other property includes a housing containing a GPS receiver for receiving GPS signals from overhead satellites, a cellular phone transceiver, a microprocessor, and a battery. Following a theft, the microprocessor activates the cellular phone transceiver to dial the telephone number of a central monitoring station. The present invention is distinguished in that it is directly installed into the theft risk [i.e. the portable computing device] in which it is installed.

In US20040075539A1, 'Vehicle monitoring system', the prior art is "Remote theft monitoring for vehicle by sensing vehicle displacement, engine operation and key entry." When a possible theft condition is determined, the service provider server will generate a message to alert a security agency. The present invention disclosure is distinguished by its use in portable computing devices and its requirement for active external activation by an owner to operate its novel features and benefits.

In U.S. Pat. No. 6,049,269, 'Wide area wireless system for access into vehicles and fleets for control, security, messaging, reporting and tracking', the prior art invention uses a paging signal initiated by owner if vehicle is stolen, on-board paging receiver, decoder, controller, alarm and ultimate disablement of vehicle. The present invention is an improvement in its use of a novel software based method that employs an insertable GPS device into portable computing devices. In the present invention, a novel software based method computes a GPS system purchase price related to the savings from economic loss by recovery or by cash compensation in the event of an unrecoverable loss of said portable computing device.

Notwithstanding the prior art discussed herein, the invention is novel because none of the prior disclosures either alone or in combination are sufficient to disclose the invention set forth in this application. As a result, the present invention offers numerous advantages over the prior art, including, without limitation:

a) The claimed invention discloses a novel and useful GPS device and antennae system that may be covertly and efficiently installed into a portable computing device.
b) The invention is a novel means to employ software in the GPS device that may instruct the portable computing device to transmit, alter or destroy data files in the portable computing device to prevent loss of economic value or personal privacy.
c) The invention is a novel software based method and financial system to acquire and install such a GPS device and software and to provide an insurance product to compensate for loss by the theft of or accidental loss of portable computing devices.

BRIEF DESCRIPTION OF DRAWINGS

FIGS. 1A-1C are exemplary schematics illustrating the elements of the invention device in various view planes that demonstrate the composition of electrical and structural elements necessary for installation into a portable computing device.

FIG. 1A is a frontal plane view of said exemplary device.
FIG. 1B is a back plane view of said exemplary device.
FIG. 1C is a side view of said exemplary device.
FIG. 2 is an exemplary process and software block flow diagram for use of the installed exemplary device of FIGS. 1A-C in the event of theft or loss of the portable computing device to which the device is covertly affixed.

FIG. 3 is a block diagram illustrating a preferred embodiment of the method and system disclosed by the present invention which respects to, purchase, registration, signal generation, tracking and control of the installed exemplary device of FIGS. 1A-C.

DETAILED DESCRIPTION OF A PREFERRED EMBODIMENT OF THE INVENTION

The present invention is embedded into the portable computing device via an open card slot on the motherboard of said portable computing device, which is respectively illustrated in the diagrams of FIGS. 1A, 1B, and 1C. In a preferred embodiment, the device is always powered on, even when the portable computing device is not plugged in. The power drain is minimal due to the fact the device is in 'sleep mode' and allows for a SMS message to be sent to the device on demand and therefore locating the portable computing device with accuracy within 5 meters.

Unlike prior art products that are required to be connected to the Internet, the present invention can be located on demand regardless if the portable computing device is plugged in or connected to the internet. A SMS text message is sent to the device and it responds with longitude/latitude parameters of its locations. These parameters are entered into a mapping software system and locate the device and display its location on a map of the area within 5 meters of accuracy.

In contrast, prior art devices are typically embedded into the systems BIOS and can only be located from internet 'hotspots' such as Starbucks coffee, bookstores and other wired locations, etc. This means the portable computing device can only be located from an internet connection in which it is connected therefore no on demand capability exist with the prior art products and, therefore, are less accurate.

The present invention incorporates other novel features as well. For example, if desired by the owner, a transmitted message to the Silver Bullet software can be sent to and through the present invention to destroy the data contained on the hard drive rendering the portable computing device useless. The Silver Bullet software function will issue a command to the present invention that will activate a binary overwrite command that will fill the entire hard drive with 1's and 0's rendering the portable computing device useless and even unable to boot up since the operating system will also be overwritten. Prior art products do not offer or anticipate this capability.

Furthermore, in the unlikely event the portable computing device is not recovered within a definite time (ex. 15 calendar days), the risk management process of the present invention will electronically commence an order, payment and shipment process to replace the portable computing device with a comparable product of like, kind and quality or better. Additionally the risk management process can also electronically provide compensation to the owner for the lost economic value of the data files stored on the unrecovered portable computing device.

It will be obvious to one skilled in the art that the invention may take numerous forms of device and system configurations that will accommodate a diversity of covert GPS tracking devices, portable computing devices, and electronically implemented, software-based insurance and purchase business systems. What follows is a preferred embodiment of the useful novelties of the present invention. However, for one skilled in the art it will be obvious that the novel features disclosed herein may be employed with equal utility to alternate configurations of the invention elements.

The disclosed invention is the GPS personal tracking and recovery device used inside of laptops and other types of portable computing devices. In a preferred embodiment with this type of system, a battery or power source is required. If the device is charged using its internal battery it typically has four hours of run time and three days of standby time. However, if the invention device is charged using the laptop power source in which the invention device was installed, that device can operate efficiently using inside power as long as that power is available. In some cases, people will disconnect the power and/or repackage. However, when it becomes time to re-engage power, the invention device will begin transmitting again and has been set on a protocol that allows the user to continue to transmit immediately. If somebody attempts to change the exterior of the portable computing device, the invention's embedded chip will still react.

Referring now to FIG. 1A, the exemplary invention is shown in frontal plane view. At [100] the flexible antenna for GMS transmission is displayed. At [102], a GPS antenna is displayed. A telephone modem [104] provides for reception and transmission of software enabled data and instructions between the invention device and a remote invention user. A GPS transmitter [106] enables the invention device to transmit and obtain location signals from a GPS/GSM array. A SIMM card housing and apparatus [108] together with the modem [104], antennae [102, 100] and the GPS transmitter [106] are affixed and communicate with a circuit board [110]. In the present embodiment the circuit board [100] is in signal communication with the computing element of portable computing device through a connector rail [112]. The circuit board [110] has an electric power connection with the portable computing device at [114].

Referring now to FIG. 1B is a back plane 'through view' of the exemplary invention which was previously referenced in FIG. 1A. The invention illustrated in FIG. 1B maintains the same orientation as FIG. 1A and the observer views the back plane view through the front plane orientation. The conspicuous feature of FIG. 1B is a rechargeable battery element [118], affixed to the circuit board [110], which communicates with external recharging power through the battery recharge port at [114].

Referring now to FIG. 1C is an alternative side view of the invention device illustrating an alternative positioning of some of the invention device elements. More specifically, the circuit board [110] is shown housing various communication circuit elements [120] within the circuit board [110] itself. The flexible antenna [100] is mechanically affixed to the rechargeable battery [118]. The connector rail [112] and battery recharge port elements are deliberately omitted in the plane view to highlight other invention elements. However, for one skilled in the art such alternate assemblies are well understood and frequently used to minimize overall device size and/or connection compatibility to the portable computing device. Further, flexibility in the invention device element assembly lends itself to covert design in either imitation of other circuit elements or compact size. Either option is novel and useful in preventing invention device tampering or detection.

For this exemplary application, the invention tracking device will be used inside of a laptop computing device, deriving its power source directly from said computer's battery source as shown at [114] in FIGS. 1A and 1B respectively. The invention device allows the laptop owner to use either a desktop computer, a third party tracking service and/or a cellular phone for immediate tracking capability. Additionally, once the invention device registers the laptop as missing, an owner has the ability to initiate regular monitoring whereby, for example, the installed device can transmit a location, based upon plain sight, every two minutes up to every 24 hours.

This invention tracking device is useful because of the fact that there is a high theft and low recovery rate of laptops. An additional novel benefit is that this invention device can be used in almost any type of device which utilizes an AC/DC power source and which can be converted to the 12 volt standard typically required. The usefulness of this device is self-evident with the ability to recover misplaced or stolen products through the ability to have immediate real-time access based upon GPS satellite transmission.

FIG. 2 is a block diagram indicating an exemplary software enabled process utilizing the invention tracking device. Such a process starts [200] with physical installation of the invention device [205] referenced in FIGS. 1A-C. Concurrently at [205] the software components are installed in the invention device and a covert tracker device [225] such as a desktop computer, cellular phone or a telecommunications service provider system. The enabled covert tracking device system [210] remains dormant until activation by a transmitted request from the owner or authorized user to an operational covert tracker device. An activation of the installed device at [215] results in a query at [220] on whether to activate the tracking program routine. A 'no' response at [220] returns the installed device to a dormant mode at [210]. A 'yes' at [220]

requires manual activation of the software elements to activate tracking operations [225] through transmission and detection of GPS location coordinates [230]. Upon activation, the owner or authorized user is queued whether to commence data file management via the installed tracker device [235]. A 'no' at [235] returns either to the [220] tracker queue option or an automated tracking at [225] that continues periodic detection and transmission of GPS location coordinates. A 'yes' at [235] is indicative of a threat that data on the portable computing device is at risk of unauthorized use or unacceptable loss. A 'yes' at [235] thus queues the owner or authorized user to encrypt or destroy portable computing device data files at [240]. If the 'destroy' option is authorized, the invention initiates its Silver Bullet software routine to overwrite and destroy portable computing device data files. It will be obvious to one skilled in the art that the Silver Bullet software may also be used to uninstall or disable stored software programs, protocols or operating systems deemed proprietary and a cause of economic loss in the event of loss or imminent unauthorized use of the portable computing device. If the encrypt option is selected at [245] then the owner/authorized user is queried whether to transmit such data files. If a 'yes' occurs at [245] then the installed tracking device uploads and sends such files to the activation location [250]. If an owner successfully recovers the portable computing device [260], the tracking routine ends and the system is returned to its initial settings of the dormant state at [210]. If the laptop or data are not recovered within a definite time at [260], the owner then electronically files an insurance claim [265] which makes compensation to the owner for loss. Upon replacement of the lost hardware, the user process returns to [205] for installation and protection of the replacement device.

Referring now to FIG. 3, a preferred embodiment of the method of the present invention is shown. A lap top computer owner [360] who will own or owns a portable laptop [330] will procure the covert GPS device [320] in connection with a purchase agreement that incorporates an insurance policy related to a future event involving theft or loss of laptop [330]. The policy will be produced using a novels series of software algorithms that utilize, without limitation, a plurality of data inputs; the cost of GPS device [320], the cost of installation of GPS device[320], the cost of monitoring service [340], the cost of communications from monitoring service [340] to GPS satellite array [310], the cost of communication of the GPS satellite [310] with covert GPS device [320], a future time based value of information and data maintained or to be maintained on laptop [330] for which owner [360] will be compensated in the event of theft or loss of laptop [330]. The payments made by laptop owner [360] to insurer [350] may be a lump sum or a series of fixed or variable payments. The covert GPS device [320] will be installed by a certified contractor and will place the covert device [320] into laptop [330] in a manner that makes it difficult to recognize the covert device as other than the normal hardware of laptop [330]. The contractor will also connect the covert device power receptacle to the power system of laptop [330]. The contactor will enable an anti tampering feature of covert device [320] to trigger an alarm or automatic transmission signal as part of the security protection features of the invention. The covert GPS device [320] will be electronically enabled using embedded software algorithms that may also be encrypted to provide security to the owner [330] and an identifier code for monitoring service [340] and GPS satellite array [310]. In the event of a theft or loss of laptop [330], owner [360] will communicate the event to insurer [350]. Insurer [350] will communicate with service [340] to initiate a tracking algorithm to locate laptop [330]. Alternately, the owner [360] call report will be automatically forwarded to monitoring service [340]. GPS device [320] will receive an enabling transmission from GPS Satellite [310] and commence periodic GPS location emissions using power derived from laptop [330] power source.

In a further variation of the invention, the monitoring service [340] will manually or automatically transmit to the GPS Satellite [310] an authorize for Covert device [320] to initiate a wireless data transmission of files stored on laptop [330] to secure files managed by the monitoring service [340]. These files will be forwarded under secure transmission or recorded on to a suitable data storage medium for physical delivery of such data files stored on laptop [330] to owner [360]. In a still further variation of the invention the instructions regarding data stored on laptop [330] may instruct the laptop [330] to alter or eradicate such stored files.

In summary and without limitation, the invention is comprised of the following elements:

A first element consisting of fabricating an installed covert tracking device further comprised of circuit, electronic and power elements as shown in FIGS. 1A, 1B, and 1C that is compatible with the portable computing device into which it is installed;

A second element where said covert tracking device is acquired in conjunction with a software generated insurance policy and tracking system to mitigate the risk of loss of a portable computing device into which said covert tracking device is installed;

A third element of installing the covert tracking device covertly inside the portable computing device and further attaching it to the power source and/or battery of said portable computing device where said tracking device itself does not rely on any functions from the portable computing device and is stand-alone other than the power source;

A fourth element where, once the tracking device is installed in the portable computing device, and in the event for whatever reason the portable computing device is misplaced and or stolen, an owner of the lost portable computing device will have the ability to telecommunicate to activate a recovery protocol utilizing the tracking features of the covert tracking device;

A fifth element where recovery of all portable computing devices using this tracking device invention is based upon real-time GPS locations and, in the event recovery is not immediate, the tracking device itself receives a communication that allows the tracking device to power on and regularly source and transmit GPS location data until actual recovery or determination of an unrecoverable loss of said portable computing device.

A sixth element where a portable computing device being misplaced or stolen, a certain minimum time must lapse (ex. 5 days) before it is deemed unrecoverable. If the portable computing device is not recovered within the lapsed period, a risk management underwriter will be obligated, through said insurance policy, to replace the unrecovered portable computing device together with a compensable sum for the economic loss of proprietary data files.

It will be obvious to one skilled in the art that this invention device, method and process apply to numerous other types of portable computing devices. The immediate invention opportunity appears to be with laptops, as there is apparently a unique and unmet need to mitigate sensitive and valuable data storage and restriction issues in the event of loss or theft of the portable computing device.

The inventors claim:

1. A compact global positioning satellite device, installed into a portable computing device, comprising:
   utilization of an electrical power system of either said portable computing device or a separate battery system affixed to said installed global positioning satellite device;
   installation of a data port to communicate digitally with an operating system of said portable computing device; and
   operation of a signal reception and transmission assembly in said global positioning satellite device for wireless communication with one or more global positioning satellite arrays that is conditioned upon an input indicating the theft or loss of said portable computing device;
   wherein the global positioning satellite device is configured to transmit geographic coordinates of said installed global positioning satellite device to assist the locating and recovery of said portable computing device;
   wherein one or more received transmissions authorize the installed global positioning satellite device to instruct the portable computing device to alter or eradicate its electronically stored records; and
   wherein said one or more received transmissions authorize the installed global positioning satellite device to instruct the portable computing device to alter or eradicate electronically stored records utilizing a random binary fill 128 bit encryption that is capable of de-encryption and data recovery if the portable computing device is located.

2. A compact global positioning satellite device, installed into a portable computing device, comprising:
   utilization of an electrical power system of either said portable computing device or a separate battery system affixed to said installed global positioning satellite device;
   installation of a data port to communicate digitally with an operating system of said portable computing device; and
   operation of a signal reception and transmission assembly in said global positioning satellite device for wireless communication with one or more global positioning satellite arrays that is conditioned upon an input indicating the theft or loss of said portable computing device;
   wherein the global positioning satellite device is configured to transmit geographic coordinates of said installed global positioning satellite device to assist the locating and recovery of said portable computing device;
   wherein one or more received transmissions authorize the installed global positioning satellite device to instruct the portable computing device to alter or eradicate its electronically stored records; and
   wherein said one or more received transmissions authorize the installed global positioning satellite device to instruct the portable computing device to alter or eradicate electronically stored records where a binary fill is activated over-the-air and is not required for the portable computing device to be plugged into an electrical outlet.

3. A compact global positioning satellite device, installed into a portable computing device, comprising:
   utilization of an electrical power system of either said portable computing device or a separate battery system affixed to said installed global positioning satellite device;
   installation of a data port to communicate digitally with an operating system of said portable computing device; and
   operation of a signal reception and transmission assembly in said global positioning satellite device for wireless communication with one or more global positioning satellite arrays that is conditioned upon an input indicating the theft or loss of said portable computing device;
   wherein the global positioning satellite device is configured to transmit geographic coordinates of said installed global positioning satellite device to assist the locating and recovery of said portable computing device;
   wherein one or more received transmissions authorize the installed global positioning satellite device to instruct the portable computing device to alter or eradicate its electronically stored records; and
   wherein said one or more received transmissions authorize the installed global positioning satellite device to instruct the portable computing device to alter or eradicate electronically stored records where a binary fill de-encryption is activated over-the-air and is not required for the portable computing device to be plugged into an electrical outlet.

4. A method of utilizing a compact global positioning satellite device installed in a portable computing device as part of an insurance and risk management service to mitigate the economic cost of loss or theft of said portable computing device and any proprietary data files stored therein, the method comprising:
   receiving electrical power from either said portable computing device or a separate battery system affixed to said global positioning satellite device;
   installing a data port to communicate digitally with an operating system of said portable computing device;
   operating a signal reception and transmission assembly in said global positioning satellite device for wireless communication with one or more global positioning satellite arrays conditioned upon an input indicating the theft or loss of said portable computing device; and
   determining a value and payment scheme for said insurance and risk management service using a series of computerized algorithms;
   wherein one or more inputs to said computerized algorithms are selected from the group consisting of the cost of said global positioning satellite device, the cost of installation of said global positioning satellite device, the cost of a monitoring service, the cost of communications from the monitoring service to the one or more global positioning satellite arrays, the cost of communication between a global positioning satellite and a covertly installed global positioning satellite device, and a future time based value for information and data maintained or to be maintained on said portable computing device for which an owner will be compensated in the event of theft or loss of said portable computing device.

5. A compact global positioning satellite device installed in a portable computing device comprising:
   an electrical power system configured to receive power from either said portable computing device or a separate battery system affixed to said installed global positioning satellite device;
   a data port configured to communicate digitally with an operating system of said portable computing device; and
   a signal reception and transmission assembly in said global positioning satellite device configured to communicate wirelessly with one or more global positioning satellite arrays and to transmit geographic coordinates of said installed global positioning satellite device to assist the locating and recovery of said portable computing device, wherein transmission of the geographic coordinates is conditioned upon an input indicating the theft or loss of the portable computing device;

wherein one or more received transmissions cause the installed global positioning satellite device to instruct the portable computing device to modify electronically stored records utilizing a random binary fill or encryption that is capable of decryption and data recovery if the portable computing device is located.

6. The compact global positioning satellite device installed in a portable computing device of claim 5, wherein the one or more received transmissions are wireless.

7. The compact global positioning satellite device installed in a portable computing device of claim 5, wherein the one or more transmissions cause the installed global positioning satellite device to instruct the portable computing device to decrypt encrypted electronically stored records.

* * * * *